United States Patent [19]

Gindi

[11] 4,042,783
[45] Aug. 16, 1977

[54] METHOD AND APPARATUS FOR BYTE AND FRAME SYNCHRONIZATION ON A LOOP SYSTEM COUPLING A CPU CHANNEL TO BULK STORAGE DEVICES

[75] Inventor: Abraham M. Gindi, San Jose, Calif.

[73] Assignee: International Business Machines Corporation, Armonk, N.Y.

[21] Appl. No.: 713,453

[22] Filed: Aug. 11, 1976

[51] Int. Cl.² .......................... H04J 3/08; H04L 7/08
[52] U.S. Cl. ............................... 179/15 AL; 178/69.1
[58] Field of Search ..................... 179/15 AL, 15 BS; 340/172.5, 146.1 D; 178/69.1, 58

[56] References Cited

U.S. PATENT DOCUMENTS

| | | | |
|---|---|---|---|
| 3,906,153 | 9/1975 | Sawtschenko | 179/15 AL |
| 3,919,483 | 11/1975 | Gindierae | 179/15 AL |
| 3,919,484 | 11/1975 | Maxemchuk | 179/15 AL |
| 3,967,060 | 6/1976 | Subramainian | 178/69.1 |

Primary Examiner—Thomas A. Robinson
Attorney, Agent, or Firm—R. Bruce Brodie

[57] ABSTRACT

A method and apparatus for synchronizing frame delimited bit stream messages on a high speed loop for communication among storage system elements. The method especially minimizes the time for attaining frame and byte synchronization among terminals attaching storage elements to the loop. The method comprises the steps of (1) synchronizing terminals downstream from a faulty terminal to a first synch reference as generated by the faulty terminal and further (2) synching the terminals upstream therefrom to a second synch pattern generated by the primary terminal responsive to the first reference. As a consequence, the system resynchs as a function of resynching of the faulty station alone. Transmission efficiency is improved by logically assigning for loop attachment only those loop secondary terminals whose storage elements have an aggregate bandwidth less than the available instantaneous loop bandwidth. Further improvement is obtained by dynamically varying the frame assignments. Finally, efficiency is achieved by minimizing the time to acquire and reacquire byte and frame synchrony loss caused when the loop is initially powered on or by transient electrical disturbances.

7 Claims, 10 Drawing Figures

LOOP CONTROLLER ALGORITHM

FIG. 4

DAD FRAME USE ALGORITHM

FIG.5

DAD READ ALGORITHM
FIG. 6

DAD WRITE ALGORITHM
FIG. 7

WAVE FORM RELATIONS AMONG DIFFERENTIAL SIGNALS,
POSITIVE AND NEGATIVE DATA PULSES,
AND THE PHASE LOCKED OSCILLATOR CLOCK

DEVICE ADAPTER SYNCH ALGORITHM

FIG. 10 — LOOP CONTROLLER SYNCH ALGORITHM

METHOD AND APPARATUS FOR BYTE AND FRAME SYNCHRONIZATION ON A LOOP SYSTEM COUPLING A CPU CHANNEL TO BULK STORAGE DEVICES

BACKGROUND OF THE INVENTION

This invention relates to byte and frame synchronization on loop systems coupling terminals attaching high data rate devices, and, more particularly, to systems coupling terminals attaching a CPU channel and bulk storage devices such as disks and tapes.

Loop systems capable of transmitting data at megabyte per second rates customarily use equal fixed length multibyte frames, each frame being assignable to only one terminal at a time. Also, such systems may have a loop delay or latency greatly exceeding the fixed length frame duration by virtue of the high data rate.

A CPU channel accesses data on DASD storage devices by communicating a series of instructions identifying the record location in terms of disk drive, storage volume, disk (track) and angular position and the reading or writing operation of interest. The instructions termed channel command words are interpreted by a controller common to the disk drives for actually positioning the access mechanism relative to the storage device and executing the read or write operation. Because the availability of the channel and the response times of the storage system to the accessing, reading, and writing of records varies, the coupling between the channel and the DASD is "loose", i.e., transfers are made by way of a demand/response protocol. This means that the status of a device is first ascertained and if it is available, then one data transaction can take place. This minimizes the need for buffering even though the "speeds" of the devices differ.

The coupling of a CPU channel to a plurality of storage devices on a time shared basis via a loop does not change the protocol in principle. It does mean that account must be taken of the special characterisitcs of loops. For example, loops for use with high data rate storage devices must make provision for disconnecting a terminal which might overrun the system. Alternately, locking out of those terminals which prospectively could overrun the system is desirable. This situation occurs for two reasons. First, bulk storage devices such as disks and tapes lack a start/stop capability on a character basis. In contrast, they transfer data by multiple byte, record, or entire track. Second, for volume transfer, a broad bandwidth (high data rate) is mandatory. In this regard, overruns occur when the available loop bandwidth is less than the aggregate bandwidth of all terminals requesting service.

A loop protocol for coupling the channel and storage devices must provide for sending access commands from the channel, writing of data only to the extent that the receiving device can accommodate the transfer, and allocating bandwidth so as to avoid blocking some loop secondary terminals in favor or others or overrunning of the device. In the prior art, some loop protocols assign a frame/slot to a device on a permanent basis. Consequently, time (bandwidth) is wasted if the slots are not utilized. Where a loop protocol requires the primary terminal to centrally allocate slots, the primary will not be cognizant of the instantaneous data rate variations of devices. This, in turn, requires the primary to transmit assigned frames/slots at a rate higher than the device. This, too, is wasteful because no other device can utilize the excess bandwidth assigned to the overrunning device. Still other loop protocols utilize distributional schemes such as optional response polling. In an ORP system, the overhead frames at the beginning of each cycle together with its variable length place buffering requirements on each device. The number of wasted frames is at least equal to the loop latency during each ORP cycle.

Any loop system time sharing its facilities among different addressable terminals needs a frame format having an address, control, and data portion thereof. The address portion must include the addressee and/or may include an addressor. The control portion is usually reserved for indicating type or mode, i.e., service request, command, write, read, device status and frame status, i.e., available/unavailable, full/ empty. The frame format as might be expected implements the demand/ response protocol. For example, if the channel wants to write data on a specific storage device, then the storage device must have some way of positively indicating availability and readiness to receive data. This is communicated by means of a status frame. To avoid being overrun, the device sends a "write" request frame from the secondary to the primary whenever its data buffer has space for at least one frame of data. In order to allow as small a data buffer as possible, this loop protocol constrains the primary to respond to every write request with a minimum and invariable time delay. The secondary can take advantage of the resulting invariable loop latency by sending its request before it actually needs the data.

In those loop systems in which the loop delay is a multiple of the frame length, then it may also be said that the bit stream propagation contains frequency components approaching the upper frequency cutoff of the propagation medium such that propagation is affected by phase, frequency, amplitude, distortion and jitter. The sources of jitter are thought to be due to inter-symbol interference and both to systemic error and random noise signals which unpredictably modulate signals on the loop. This produces sudden shifts in frequency or amplitude. Relatedly, the propagated jitter on a low speed loop is usually small compared to the bit interval. This means that low speed loop bit resynchronization is not difficult. In contrast, a high speed loop demands a high inertial clocking system relatively independent of bit jitter.

The aforementioned propagation impairments impose severe demands on high speed loops. Thus, a terminal on a high speed loop usually detects loss of bit synch only because it is accompanied by a loss of frame synch. The terminal nevertheless continues to retransmit incoming data without intentionally modifying it until the frame synch is recaptured. During this resynchronizing period the terminals on prior art high speed loops inject errors into the data stream because their oscillator has been operating at a frequency different from that of the incoming data.

Typically, in the systems of the prior art, terminals upstream from an out-of-synch terminal may continue to transmit data unaware that the data is not being properly passed onto the primary terminal. The data errors are detected by the primary, of course, at the expense of repeating the entire transmission. In high speed loops adapted to volume transmission, the requirements of both high reliability and continuity of throughput make message repetition and frequent "handshaking" both of which decrease information transfer unacceptable.

The prior art subsequently cited is generally directed to low speed loops. By this is meant the fact that the loop delay or latency is less than the frame duration.

The art of interest includes Donnan and Kersey, "Synchronous Data Length Control: A Perspective", by the IBM Systems Journal, No. 2, 1974, pages 140–162. Donnan references only frame synchronization and is not concerned with synchronization down to the byte or smaller information level. Other references considered only synchronization at the frame level. Graham, U.S. Pat. No. 3,632,881 FIG. 2; and Deutsch, U.S. Pat. No. 3,639,694, col 4, lines 39–48, use a system of 24 contiguous bits for synchronization in order to maintain synchronism within the various devices in the communication system and for providing separation between adjacent communication frames. Deutsch is primarily directed to the loop transmission of data among a large number of low data rate sources and sinks clustered on a time multiplex basis.

Other references include Hartmann, U.S. Pat. No. 3,859,466; Thomas, U.S. Pat. No. 3,652,799; and Williams U.S. Pat. No. 3,424,864. These references typify the prior art attention to low speed terminal oriented loops rather than loops in which delay is an integral multiple of frame lengths.

Hartmann and Williams require each station connected to every other station of a network over a duplex channel to utilize an operating frequency common to all in which frequency changing at any station is a function of phase comparison. In both Hartmann and Williams, the common frequency represents an average value, although Hartmann will allow a station to join the network with a minimal disturbance thereto. However, in both references a station connected to the network that loses synch will disturb the other station and cause errors in communication until they are synchronized. Lastly, Thomas detects a lack of synchronization by the non-correspondence between consecutive frame synch signals with resynchronizing being performed in parallel.

For completeness, reference is made to Sawtschenko, U.S. Pat. No. 3,906,153. In this patent there is described the resynching of frames clocked on a loop with frames communicated to the loop over a half duplex path from a remote source. Frame resynching is accommodated at the loop primary terminal by a slowly varying phase adjustment to avoid loss of "bit synch".

SUMMARY OF THE INVENTION

It is an object of this invention to improve utilization of bandwidth among terminals communicating on a loop system. It is a further object to effectuate the improvement on loops attaching high data rate devices such as CPU channels and bulk storage devices. It is a specific object to improve bandwidth utilization by a method and means for minimizing the time to acquire and reacquire byte and frame synchrony.

This object is attained in a loop system attaching a CPU channel to the loop primary terminal and attaching independently actuable storage devices to the loop secondary terminals. Each terminal is adapted to selectively generate repetitive framing intervals at a rate so high that the frame duration is less than the loop latency. Each frame is equal fixed length and multibyte. Further, each frame has an address, control and data portion thereof. The control portion contains a code indicative of frame type such as availble or unavailable, empty or full, or request for service. Data is written onto or read from the storage devices in response to access commands originating from the CPU channel and transmitted through the primary terminal to the secondary terminals during selected frames.

The method and means of the invention regain synch with a minimum of delay after an interruption. Assuming a temporary interruption of the loop due to a failure of loop secondary terminal $i$, then the next downstream terminal $i+1$ immediately goes out of synch significantly; data transmission downstream stops; and terminal $i+1$ generates a first signal for use as a sycnh reference by downstream terminals $i+2$, $i+3$, . . . In response to either the first signal or the out-of-synch condition, the primary terminal generates a second signal for use as a synch reference by upstream terminals . . . , $i-3$, $i-2$, $i-$ to the extent that either the $i$th terminal can either detect and correct its own failure or be appropriately bypassed. The $i$, $i+1$, $i+2$, . . . and subsequent downstream terminals synched to the first signal reset their bit counters and slowly begin to synch to the incoming extra synch bits embedded in the second signal. This occurs slowly enough so that the $i+1$, $i+2$, . . . downstream terminals can follow without losing bit synch.

More particularly, a terminal detecting an out-of-synch condition suspends downstream data transmission and sends only blank frames as a synch reference. These frames consist of a byte's worth of 0's separated by a synch bit, i.e., 1000000001000000001. The downstream terminals pass this on to the primary. The primary, in turn, generates sycnh frames to terminals upstream from the faulty terminal as a sycnh reference. A synch frame consists of two 1's every 12 bytes worth of blank frame, i.e.,

| Byte 1 | Byte X | Byte 12 |
|--------|--------|---------|
| 11000000010000000001...000000011. | | |

Note, the frame synch bit is the first bit of byte 1, rather than a 109 bit. The frame is 108 bits. The frame synch may be any pattern in the first byte. The faulty terminal either detects and corrects its anomaly or it is bypassed. As the synch anomaly is being corrected, the output of this terminal will change phase gradually, so that all terminals downstream will follow without losing synchrony. When synchrony is regained, the terminal will propagate the synch frame. The downstream terminals then resynch to the extra bit in the synch frame by resetting their internal counters to correspond to the frame delimiting bits. Since the downstream terminals do not lose synchrony, they will propagate the synch frame as soon as they receive it. Resetting their internal counters does not cause any phase or frequency change to their output bit stream.

Advantageously, the above described method and means reduce synch acquisition time to that of the faulty terminal alone. In the invention all loop data communication is abruptly terminated and a systematic sequence is substituted in order to achieve synch. Data transmission on the loop resumes when all terminals are synchronized. This fact is communicated to the primary terminal by the receipt of the synch frame.

DESCRIPTION OF THE PREFERRED EMBODIMENT

Figure 1:
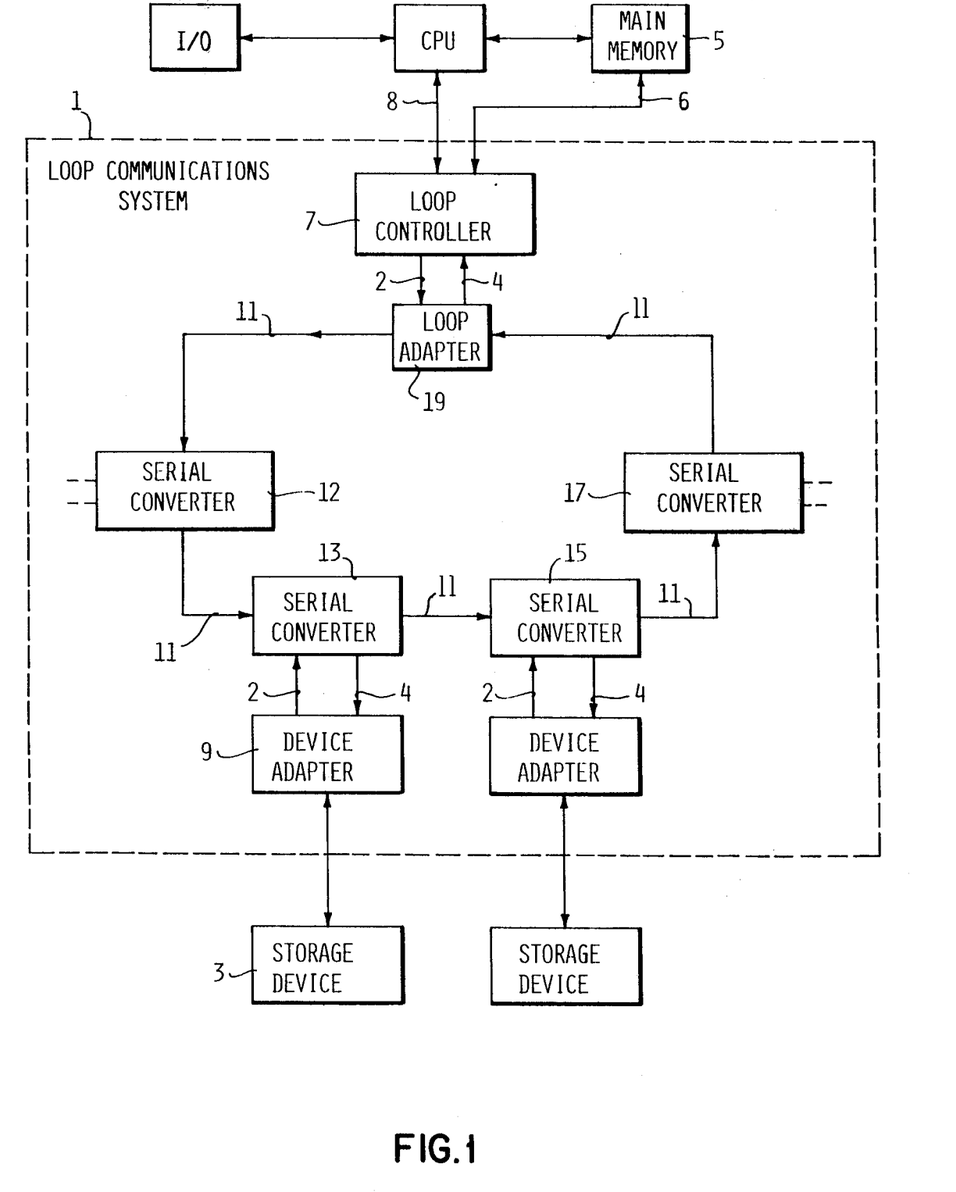
FIG. 1 shows a loop system attaching a CPU channel and a plurality of storage devices.

Referring now to FIG. 1, there is shown a loop communications system 1 for coupling one or more storage devices 3 to computer main memory 5. The main memory is coupled to loop controller 7. In this regard, the loop controller is also termed the primary terminal. Storage devices such as disks or tapes are terminated in device adapters 9, also designated as secondary terminals. The loop itself consists of a unidirectional communication path 11 serially connecting serial-to-parallel converters 12, 13, 15, 17, 19. The insertion of data onto the loop is accomplished by the parallel-to-serial conversion from a loop or device adapter through the serial converter. Likewise, the removal of data from the loop is occasioned by the series-to-parallel conversion through the converter device or loop adapter. If a permanent failure is detected in a serial converter/device adapter, a relay (not shown) is activated that bypasses the defective unit and allows the loop to continue operation.

Frame Size, Type, and Format

In the system shown in FIG. 1, a fixed frame size of 108 bits is used. This includes 64 bits of data plus overhead. The frame size in any particular instance is the result of tradeoffs and compromises. It is evident that frame efficiency could be improved, for example, by using longer frames with greater data-to-overhead ratio. Any given protocol can operate with any frame size that is desirable in a particular implementation, and it is possible to operate the subsequently described protocol with a variable frame size. For the sake of simplicity, only an equal fixed length frame system is described.

In order to permit a high data rate, clocking information is transmitted every ninth bit as a "one" bit delineating each byte of information. These bits are referred to as synch bits in this context.

This invention uses four types of frames. These are blank, synch, empty, and full frames. The blank and synch frames are nonoperative in that they are used in the automatic synchronizing routine to lock the clocks of all of the device adapters. An "empty frame" is one that does not contain information and may be used by any secondary that has information to send to the primary.

In the frame format, bit positions 0 and 1 define the start of a frame if coded as a 1 and 0, respectively, wherein they are both positioned right after a synch bit such that that the bit sequence is 110. Bit position 2 then set to 0 indicates that the loop bandwidth is saturated and no new requests for data transfer will be honored. Bit position 3 indicates frame availability when set to 1. Bit position 4, when set to 1, indicates the frame is empty and may be used to send, read, or for status information. When bit position 4 is set to 0, the frame is full. Bit positions 5, 6 and 7 define the operation or function of the frame. Bit positions 8 to 15 defining a device adapter/serial converter address contains only the address of that device adapter which can perform the data transfer operation defined by the mode bits 5,6,7. Only one data transfer operation at a time can be executed by an addressed device. Bit position 16–79 defining the data field contains eight bytes of data when the mode bits indicate read or write. If the mode indicates a command or a status frame, then the command and its parameters or the status information will be contained in the data field. The data field of a write request or an empty frame is not defined. It must not, however, contain code sequence 1,0 repetitively in the first two bits of each byte. This repetitive pattern as distinct from random data will delay a device adapter/converter that is trying to regain frame synch. Lastly, bit positions 80–95 are used for error detection. The polynomial range for the CRC are the 96 bits in each frame. The twelve synch bits are not included. Relatedly, a device adapter/converter that alters a frame in any way must send a correct CRC irrespective of the relevance of the data. A device adapter/converter may not correct an erroneous CRC of any frame that is passing through.

In loop systems of the type described, the modes of the frames may be partitioned into commands, status frames, read/write frames, write requests, and empty frames. Commands are sent from the CPU to loop controller 7 and, thence, to the device adapter in order to initiate operations. In most cases, a command and its parameters can be sent in one frame. The addressed device adapter upon receiving a command frame must change it to empty or use it for sending outstanding status. In general, a frame that is to be emptied may be treated as an empty frame for all purposes. Note, that the outgoing CRC of any frame that has been modified by a device adapter in any way must correctly reflect the entire frame. A read frame is used to send read data from storage device 3 to loop system 1 to main memory 5. A read frame can be sent on any incoming empty frame limited by the maximum bandwidth imposed upon the particular storage device. Write frames are sent out only in response to write requests on a one-for-one basis. The time lapse between the start of a request frame and the receipt of the corresponding write frame at the device adapter is equal to the loop latency. The loop latency, determined by the cable length, number of secondaries, etc. is invariant. A write request frame is sent by device adapter 9 to the loop controller to request write data. A device adapter may send write requests only after receiving a write command from the loop controller. Write requests, for example, may be sent on any empty frame or on a write frame addressed to the device adapter. Lastly, an empty frame originates from the loop controller and is an invitation to any device adapter to send read, status or request frames. An empty frame may also originate from any device adapter that has received a write or command on that frame. To utilize an empty frame, the device adapter checks only the first five bits of the frame. All other bits are ignored.

Frame Use, Reuse, and Loop Latency

Figure 5:
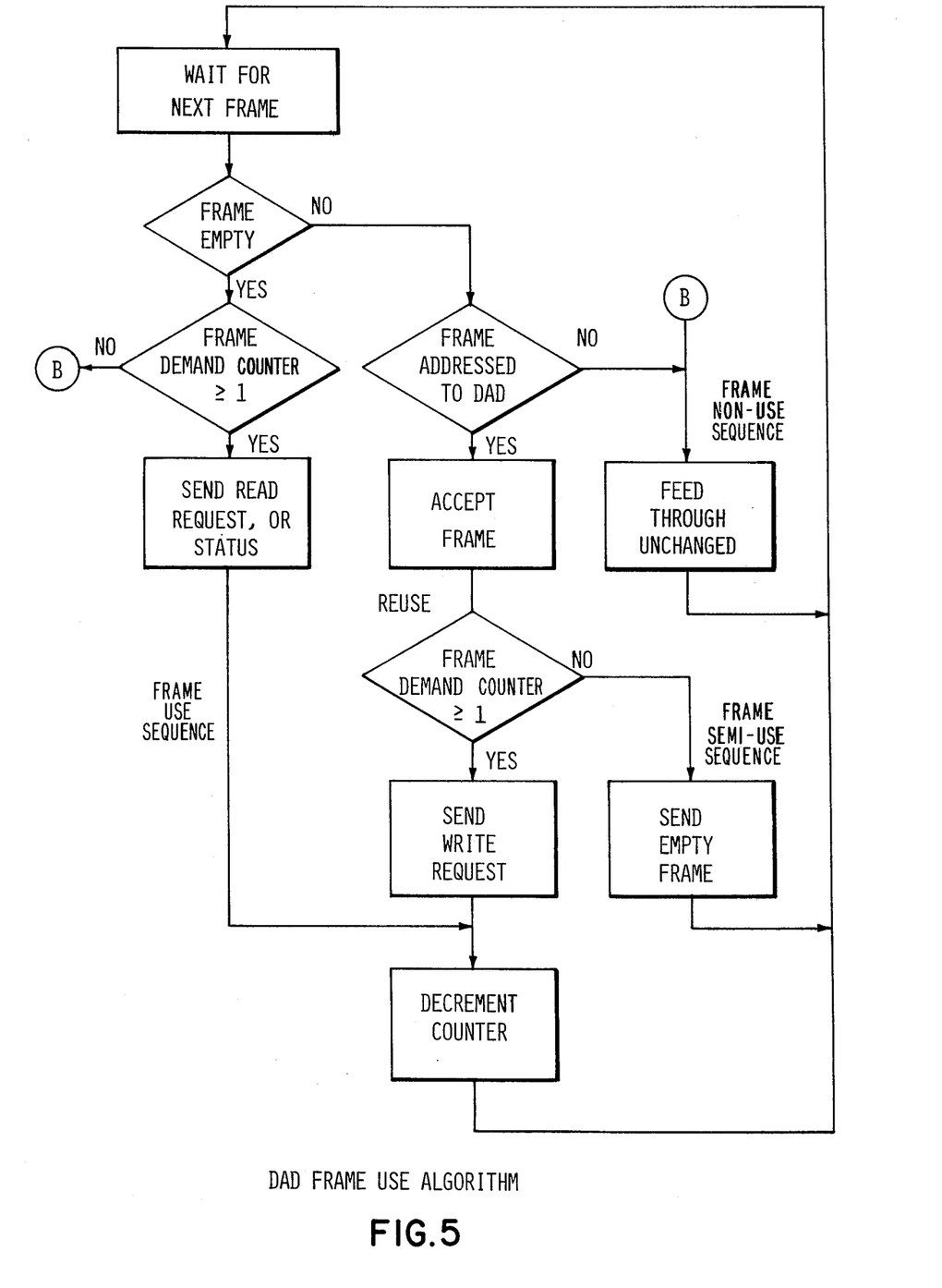
Figure 6:
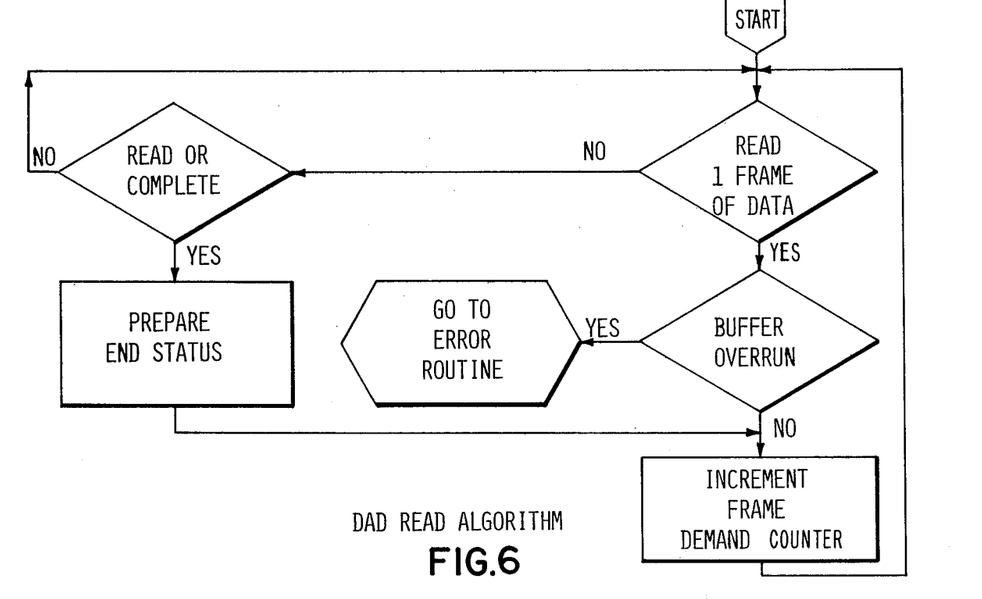
Figure 7:
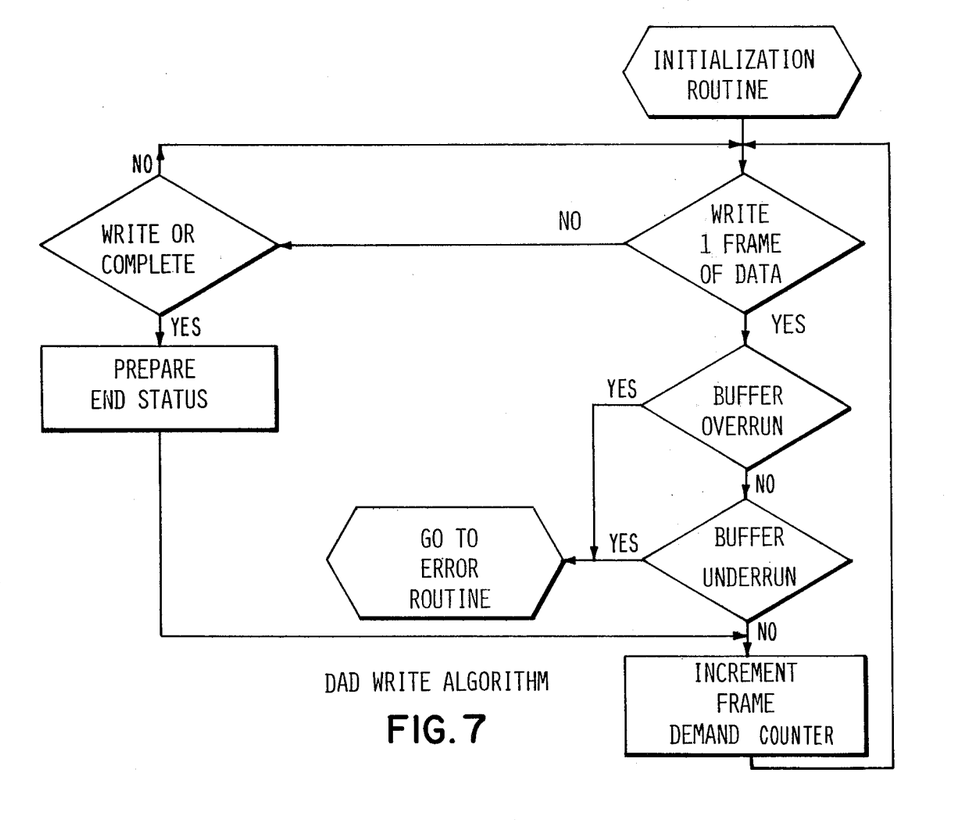

In one version of this protocol, the loop controller 7 and device adapter 9 execute protocols which give relatively fast response times in terms of loop latency. This is accomplished by designing the serial converter paired with an adapter so as to have a minimum of delay to the loop data. This means that the device adapter/converter is not able to empty out a frame that contains write data for it. By the time the address is compared, the beginning of the frame and most of the addresses have already been transmitted and cannot be changed. The device adapter has the option of changing the rest of the frame into a request for more data, or allowing it to continue unchanged, in which case no other device adapter can use the frame. It is therefore necessary for the device adapter to use write frames for its write requests, as much as possible, so as not to be wasteful of loop bandwidth. In a modified version of this protocol, referred to as the "frame reuse protocol" (FIG. 5), each device adapter effectuates a longer delay to the loop data so that after recognizing its own address it can empty the frame to allow other device adapters of the loop to use it. The device adapter may also use the frame for requesting another frame of write data if it wants to, but it is not obligated to do so since it does not represent wasted bandwidth, anymore. The frame reuse protocol version is more efficient of loop bandwidth and more desirable if the resulting long term loop latency can be tolerated.

Loop latency is the total delay around the loop expressed in frames including cable delay, device adapter delay and loop adapter delay as rounded up through an integral number of frame time periods. Specifically, loop latency for a storage loop having a frame time of 771 nanoseconds may vary from a minimum of three frames (2.31 microseconds) to a maximum of 26 frames (20.05 microseconds). The maximum is determined by certain physical characteristics of the highest speed adapter on the loop.

The Loop and Signal Conditioning

Figure 8:
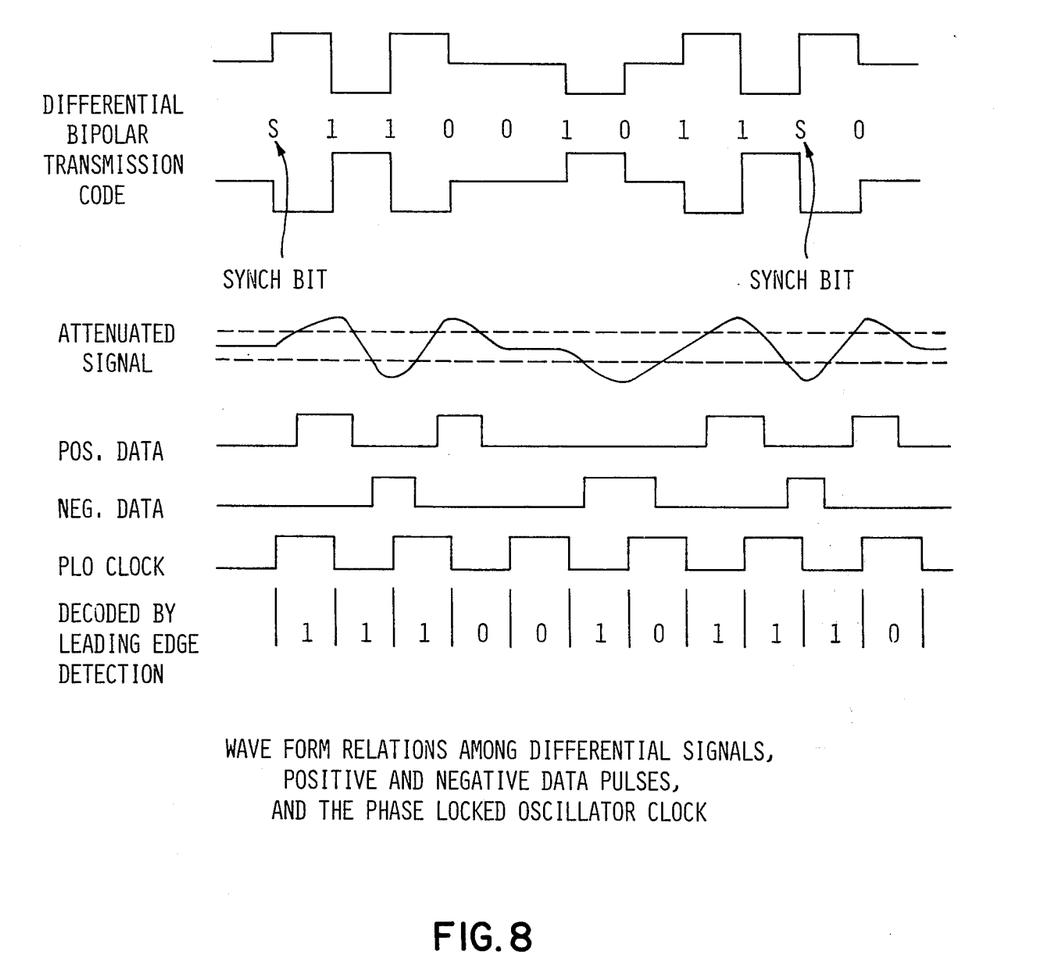
FIG. 8 is a timing and wave form diagram of a system using a bipolar ternary code with reference to loop synchronization.

Referring now to FIG. 8, taken together with FIG. 1, data is transmitted along loop 11 in serial form. The loop itself may be fabricated from a twin axial cable RG22BU. Consistent with twin axial transmission, data is transmitted upon the two conductors in differential mode, that is, the signal on each conductor is the electrical inverse of the other. This is summarized in FIG. 8. Cable receivers would consists of a differential type amplifier with a high common mode rejection ratio. This takes advantage of the superior noise rejection ability of the cable. Data encoded in a bipolar pseudoternary code represents each 1 bit by an alternate positive or negative pulse. Each is fixed at 1 bit cell time duration. A 0 is represented by the absence of a pulse.

Synchronization and clocking

In order to clock and deserialize the data properly, it is necessary to derive clocking information from the timing of the data bits. Since a long string of zeros can occur in a normal data stream, it is necessary to insert synchronizing bits at regular intervals. Consequently, a synch bit is inserted after every 8 data bits.

Data is serialized on the loop with the high order bit of the high order byte first. A data field consisting of eight bytes will be transmitted as a binary field beginning with $2^{63}$, $2^{62}$, . . . in a decreasing power of 2.

The loop communication system of FIG. 1 includes a synchronization system. The synchronization system has the communication function of maintaining accurate and stable synchronization during operation and redeeming synchronism in as short a time as possible after the loss of synch due to electrical noise or other causes of interruption.

The invention utilizes two types of synch information transmitted on the loop. These are bit synch and frame synch, both of which must be attained and further confirmed by a cyclical redundancy code (CRC) check before true synch is achieved. "True synch" is one of several synch states or levels to be described separately. For present purposes, true synch is a necessary prerequisite before a serial converter 12,13,15,17 can transmit information onto the loop. True synch must also be achieved by the receive (read) element of the loop adapter 9 before anything other than synch frames can be transmitted onto the loop.

The clocking system of each serial converter and its bit and byte counters must be synchronized to the incoming loop data in order to perform the functions of receiving, reclocking and transmitting loop data. In this invention, when a serial converter is out-of-synch, it transmits only blank frames. When the loop adapter is out-of-synch or if it is receiving "blank" frames, then it transmits only synch frames. These synch frames are passed through each converter unchanged by the upstream converters. When an out-of-synch adapter/converter receives the synch frames, then it synchronizes its clocking system, such as a phase locked loop. When it is finally in synch, the converter passes through the synch frames downstream. When the loop adapter receives the synch frames, it transmits other information on the loop in order to assist the affected converter to verify that it has again achieved true synch. After this the loop may resume transmission of normal protocol frames.

Frame Format and Synch Bits

Loop controller/adapter 7,19 generates fixed equal length frames of 108 bit times in duration. The first two-bit positions define the frame synch code and together with a previous synch bit define the start of each frame. Bit position 2 defines interrupt suppression, bit 3 deals with availability, while bit 4 indicates whether the frame is empty or occupied. Bits 5, 6 and 7 define the operation of the frame in terms of commands, read/write or status. The next eight bits designate the frame addressee. Following the frame addressee, the next full eight bytes (64 bits) are devoted to data. Lastly, sixteen bits are devoted to a cyclical redundancy code for error detection. This accounts, however, only for 96 bits. The difference between 96 and 108 bits is accounted for through the use of 12 discretely placed synchronization bits. For example, one bit is added for each data byte (eight bits). The first synch bit is placed before bit 0, the second synch bit is placed between bits 7 and 8, etc. As previously mentioned, the synchronizing bits are inserted at regular intervals in the data stream primarily to enable the deriving of clocking information from the timing of the data bits even in the presence of a long string of zeros, for example, in the data field.

Levels of Synch Status and Synch Loss and Reacquisition

Figure 9:
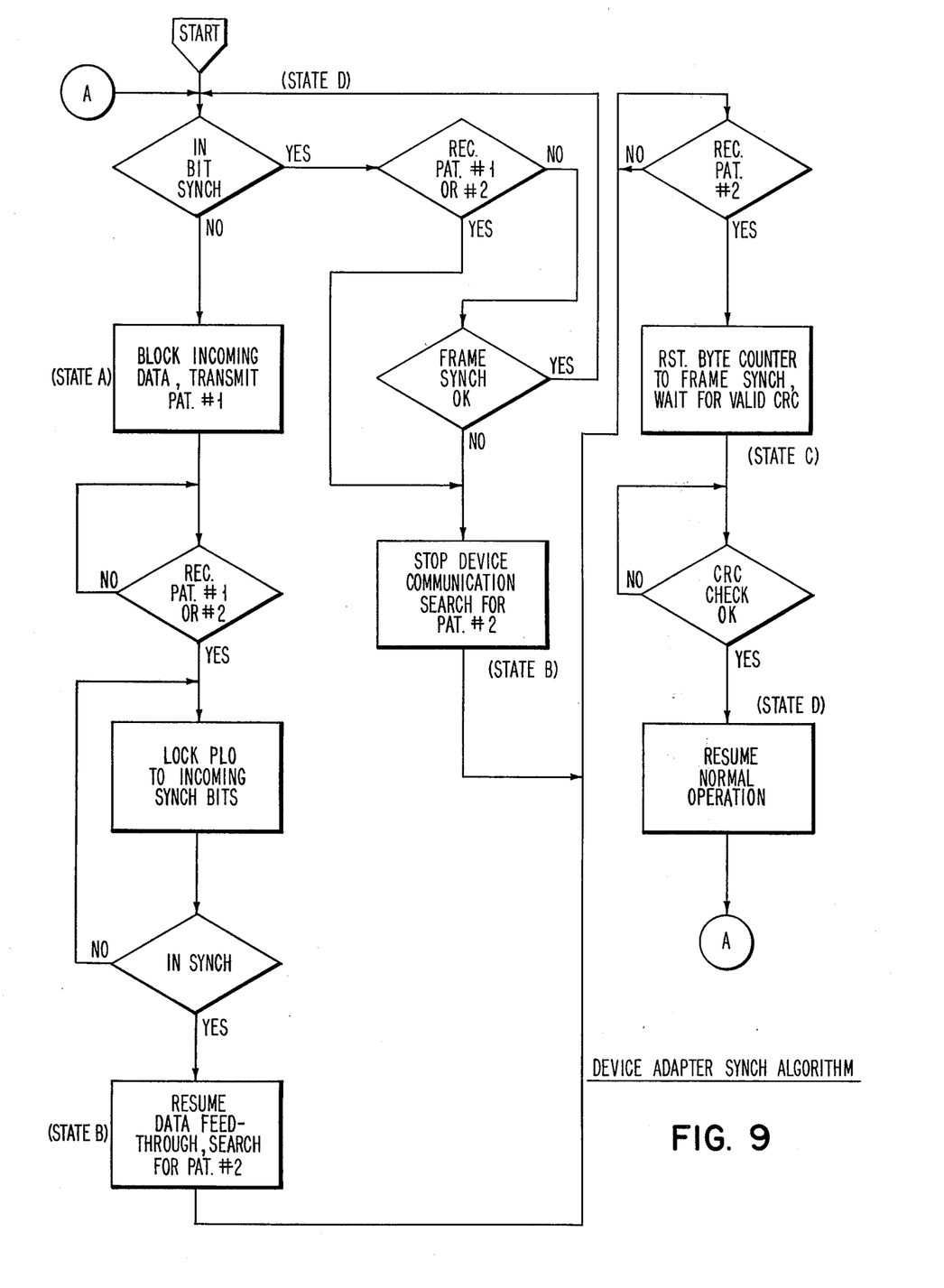
FIGS. 9–10 illustrate the synch algorithm followed by the device adapter (DAD) and loop controller (LC).
Figure 10:
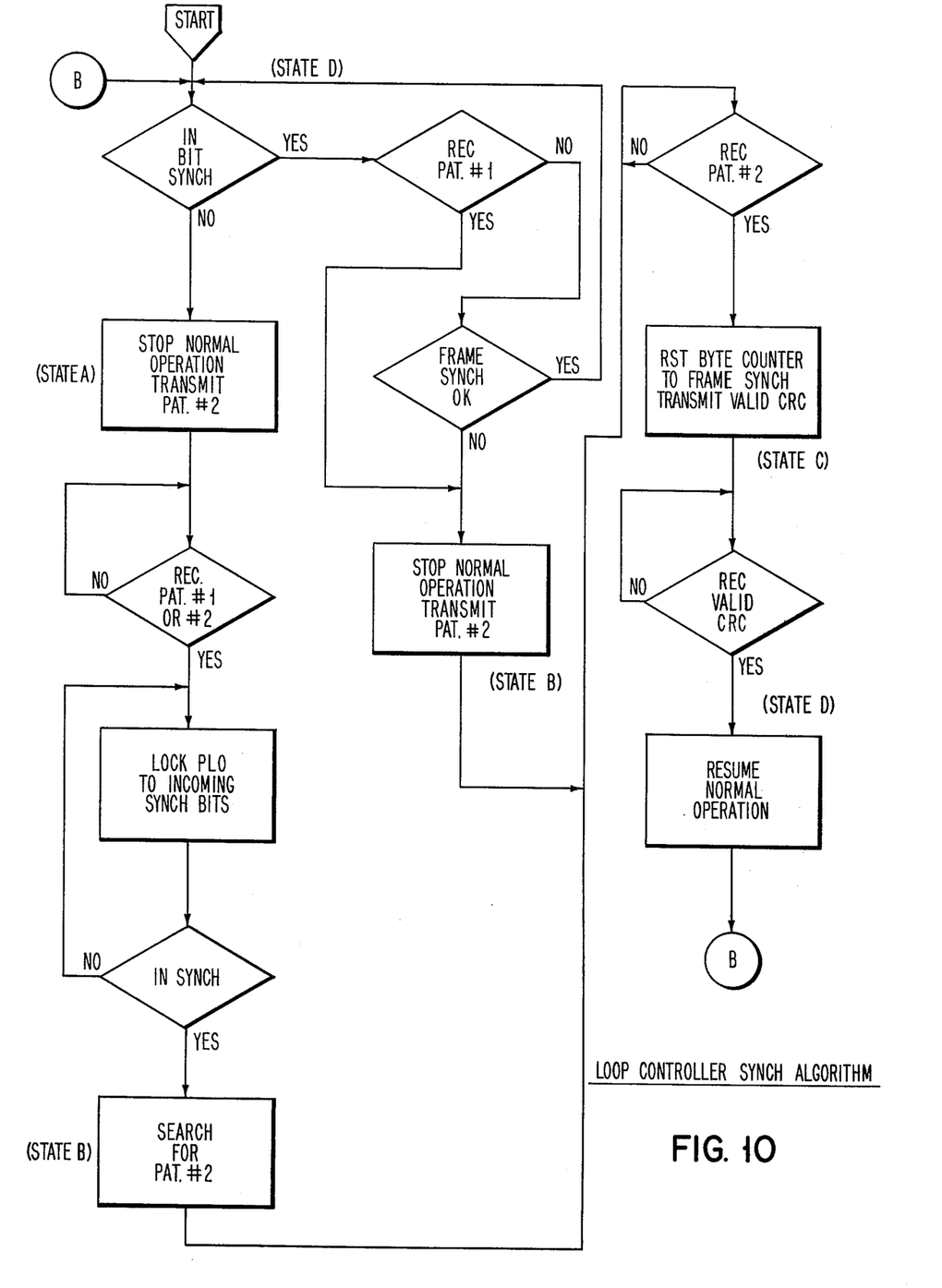

Referring to FIGS. 9 and 10, there are four levels of synch status that a device adapter or loop controller can be in at any one time. These are being out-of-synch (State A), being in bit synch (State B), being in frame and bit synch (otherwise referred to as tentative synch (State C), and being in true synch (State D).

The maintenance of the so-called "true synch" state is obtained by checking the framing bits at the beginning of every frame. If an incorrect frame synch pattern is detected, true synch is lost and the following frame is not used. A correct CRC at the end of this frame will reestablish true synch. However, if two successive long frame synch patterns are detected, "tentative synch" is lost and it must be reestablished by finding three successive good frame synch patterns. True synch is also lost when a blank frame or a synch frame is detected. True synch can be reestablished only after finding one good CRC after tentative synch is established. True synch, once established is not lost when incorrect CRC bits are detected.

Bit synch is maintained as long as a continuous stream of synch bits is detected every ninth bit. Since loss of bit synch will interrupt the loop operation, it is necessary to confirm that bit synch is definitely lost before the loop controller or device adapter is set in the "out of synch" state.

Bit synch is considered lost when after losing true synch and tentative synch, three missing synch bits are detected in any 12-byte frame period. Once bit synch is lost, the device adapter must stop data feed-through, transmit blank frames, wait to receive synch frames, reestablish bit synch, tentative synch and finally true synch. It should be recognized that the maximum time that any loop should take to achieve true synch depends on the loop latency and the time it takes one adapter to become synchronized. The dynamics of the synch states are illustrated in the following example.

The loop synch system is designed to regain synch with a minimum delay after an interruption. If one assumes a temporary interruption of the loop by the failure of the $i$th device adapter/serial converter, then the next downstream ($i+1$) device adapter/serial converter immediately goes out of synch. Indeed, the ($i+1$) serial converter transmits blank frames which contain no information except synch bits every ninth bit. No frame synch pattern is transmitted. Consequently, the ($i+2$), ($i+3$), ..., device adapters/serial converters downstream lose true synch and tentative synch but remain in bit synch to the freerunning frequency of the $i$th device adapter/serial converter. When a device adapter/serial converter is in bit synch, it can propagate all signals it receives even though it does not have frame orientation. In this way, the blank frames eventually reach the loop controller/adapter 7,19. The loop adapter then begins transmitting synch frames. These synch frames are also blank except for the inclusion of the frame synch pattern at the beginning of every frame. The device adapters/serial converters $i-j, \ldots, i-2, i-1$ upstream from the $i$th adapter/converter will receive the synch frames and propagate them, thereby remaining in bit synch to the master clock in the loop controller/adapter and in tentative synch. They will lose true synch.

Upon the $i$th device adapter/converter recovering from its failure or being bypassed, the synch frames arrive at the ($i+1$) device adapter/converter. The device adapter/converter clock which has been free running now begins to synchronize to the incoming synch bits. This occurs slowly enough that the clocks of the device adapters down the loop can follow without losing bit synch. When the ($i+1$) device adapter/converter finally is in synch to the synch bits, it steps into the bit synch status and propagates the synch frame with its associated frame synch pattern to the next device adapter/converter. Since the next device adapter/converter and all the others down the loop are also in bit synch, then the synch frame finally reaches the loop control/adapter. Meantime, all device adapters/converters that have lost tentative synch will reset their byte counters in order to conform to the frame synch bits that indicate the beginning of each frame so as to regain tentative synch. The loop controller/adapter now transmits proper CRC bits at the end of each frame so that all device adapters/converters can confirm that they have true synch. When the loop controller/adapter confirms true synch, then normal operation resumes.

Referring now to FIGS. 1, 2, 3, 9 and 10 taken together, the loop controller upon receiving blank frames from the last device adapter on the loop, will reset its bit counter and proceed to synchronize it to the incoming synch bits. As long as the loop controller is receiving blank frames, then it will remain alert to resetting this counter again if the incoming synch bits should change their timing due to the resetting of the previous device adapter bit counter. Upon receiving a number of successive synch bits on time, the loop controller is considered in synch and the second synch status of "bit synch" or state B has been attained. This status does not result in any change in the transmission of synch frames by the loop controller. It is, however, a prerequisite to the status of "tentative" synch. When the loop recognizes the first frame synch pattern (1,0) after one of the synch bits, it resets frame byte counter. If two successive frame synch patterns are found 12 and 24 bytes later, then tentative synch has been achieved. Tentative synch at the loop controller is indicative that all device adapters on the loop have attained "bit synch".

At this point, the CRC generators 50 begin generating their code on the all zero frames and insert the proper code words in the last two bytes of each frame. Since all device adapters have bit synch and probably frame synch, then the CRC bits will pass through the loop unchanged. Upon the loop controller receiving and checking the first CRC burst, it then steps into true synch and normal operation may now begin.

Figure 3:
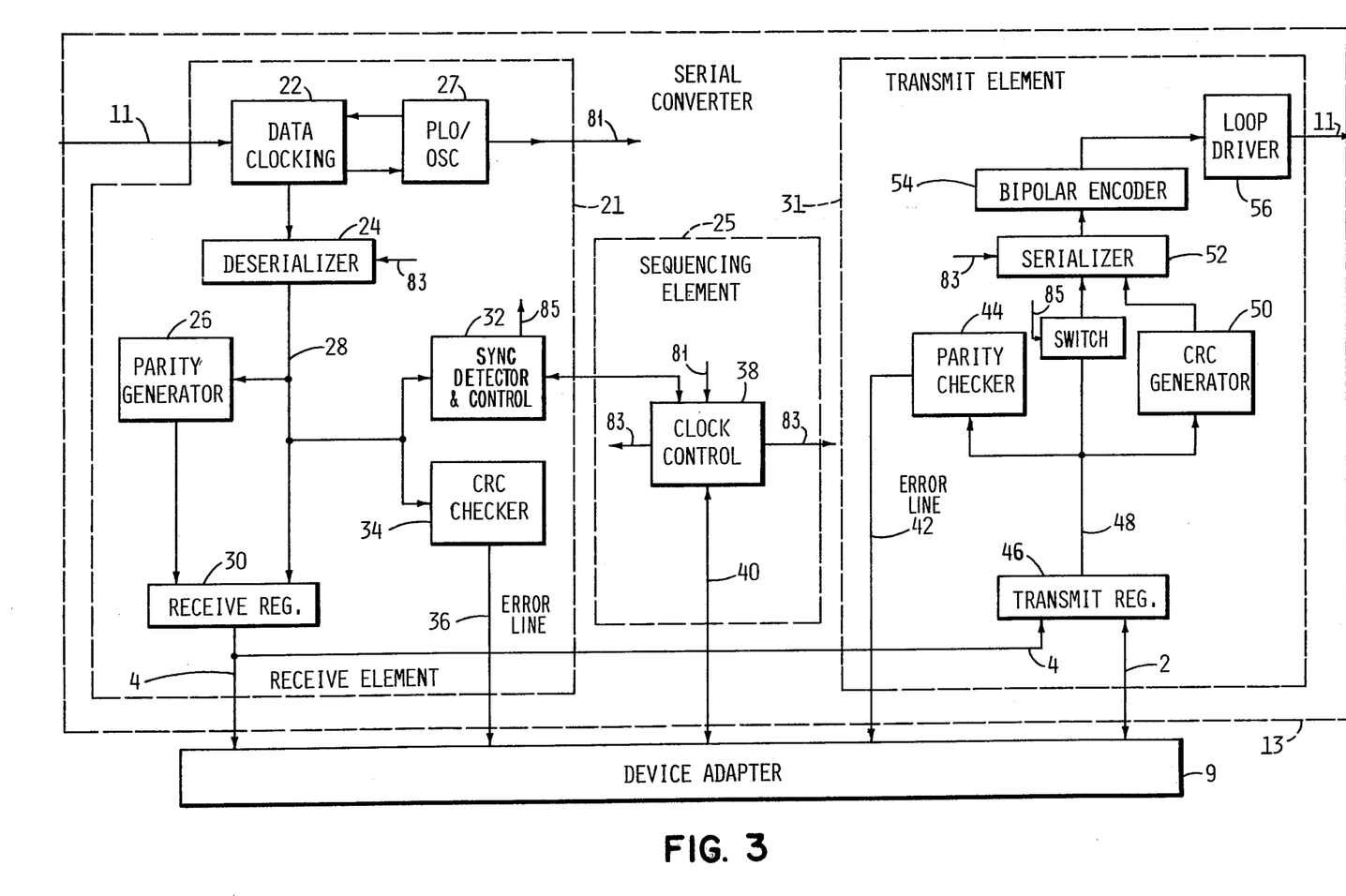
FIG. 3 represents data flow in the serial converters and the loop adapter.
Figure 4:
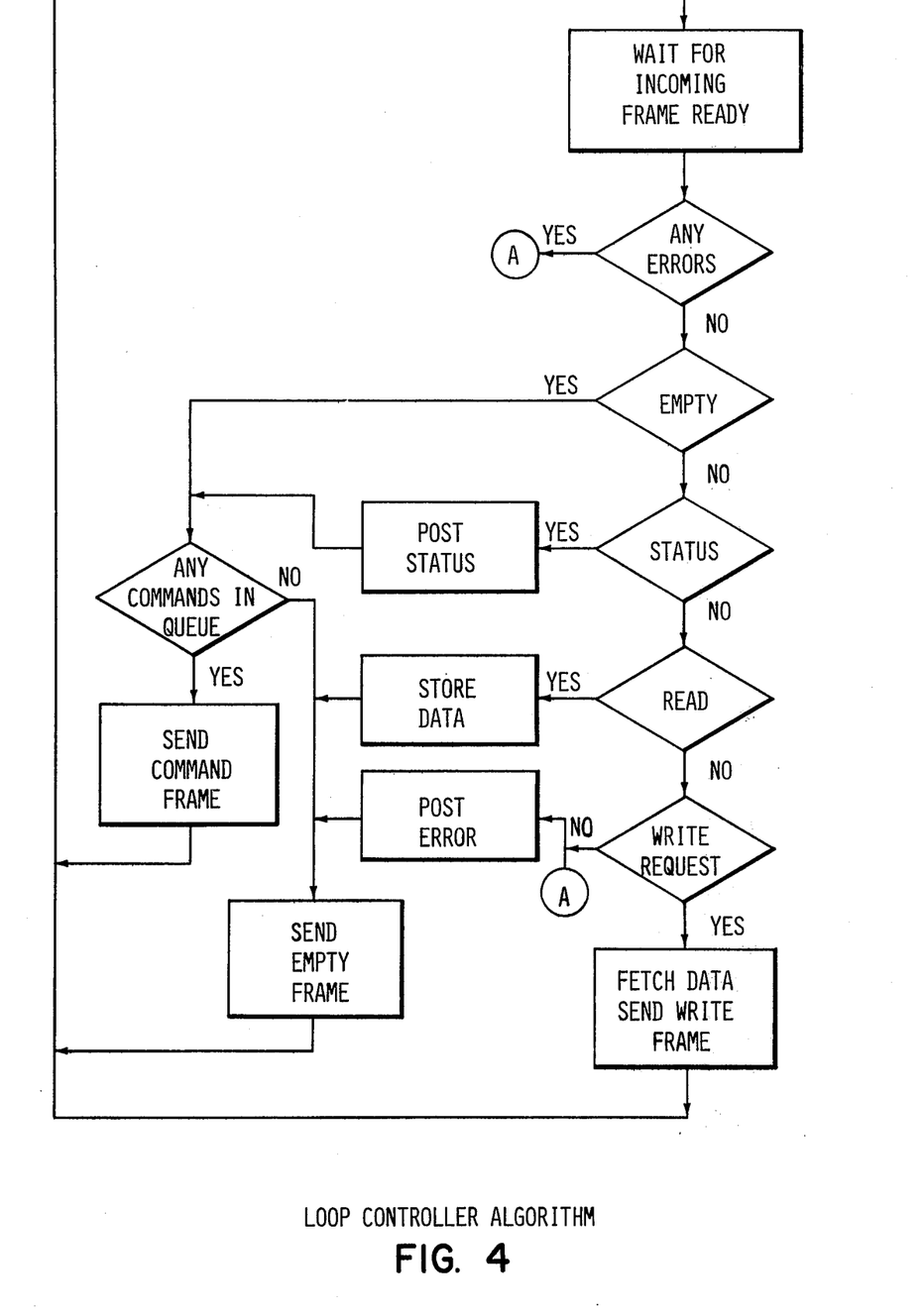
FIGS. 4–7 illustrate the loop protocols of the controller and the device adapters.

When the device adapter initailly comes on line, it is out-of-synch and free running. Read element 31 will be generating blank frames. Note, blank frames consist of all zeros except for synch bits every ninth bit, i.e., 100000000100000000100000000 . . . . Also, note that no frame synch bits are present in the blank frame.

The device adapter/serial converter will receive whatever happens to be passing by on loop 11 at that time, which may be a random read or write data, if the loop was not quiesced prior to connecting the device adapter to the loop. The device adapter/serial converter scans the loop for synch or blank frames. When the device adapter/serial converter detects that it is receiving synch frames or blank frames, the synchronizing process begins.

Upon receiving blank frames or synch frames from the loop controller or an upstream device adapter, the device adapter will reset its bit counter and proceed to synch on the incoming synch bits. As long as it is receiving blank frames, it will remain alert to resetting the bit counter again if the synch bits incoming should change their timing due to a resetting of an upstream device adapter counter.

When a number of consecutive synch bits arrive on time, the device adapter/serial converter will be considered in "bit synch". The device adapter/serial converter can now be placed into a "pass through" mode so that all input bits are passed through to the output instead of forcing blank frames. If the device adapter/serial converter were receiving synch frames, it could now propagate the frame synch bit so that downstream device adapters in the loop could attain tentative synch at the same time.

The device adapter/synch converter resets its byte counter to conform to the first frame pattern and checks for two additional frame synch patterns also occurring 12 and 24 byts later. The tentative synch is achieved when the bit synch and three successive frame synch patterns are detected at the proper time. Tentative synch is the third level of synch status otherwise known as state C.

Upon the tentative synch level being attained, the CRC decoder/checker 34 is conditioned to check incoming CRC bits at the end of every frame. When the loop controller receives three synch frames, it will attain tentative synch and begin to transmit frames with valid CRC. As soon as one correct CRC is detected at the device adapter/serial converter, then true synch is achieved and the device adapter/serial converter is ready for normal operation.

Loop Synch Algorithm, Data Flow, and Synch State

Figure 2:
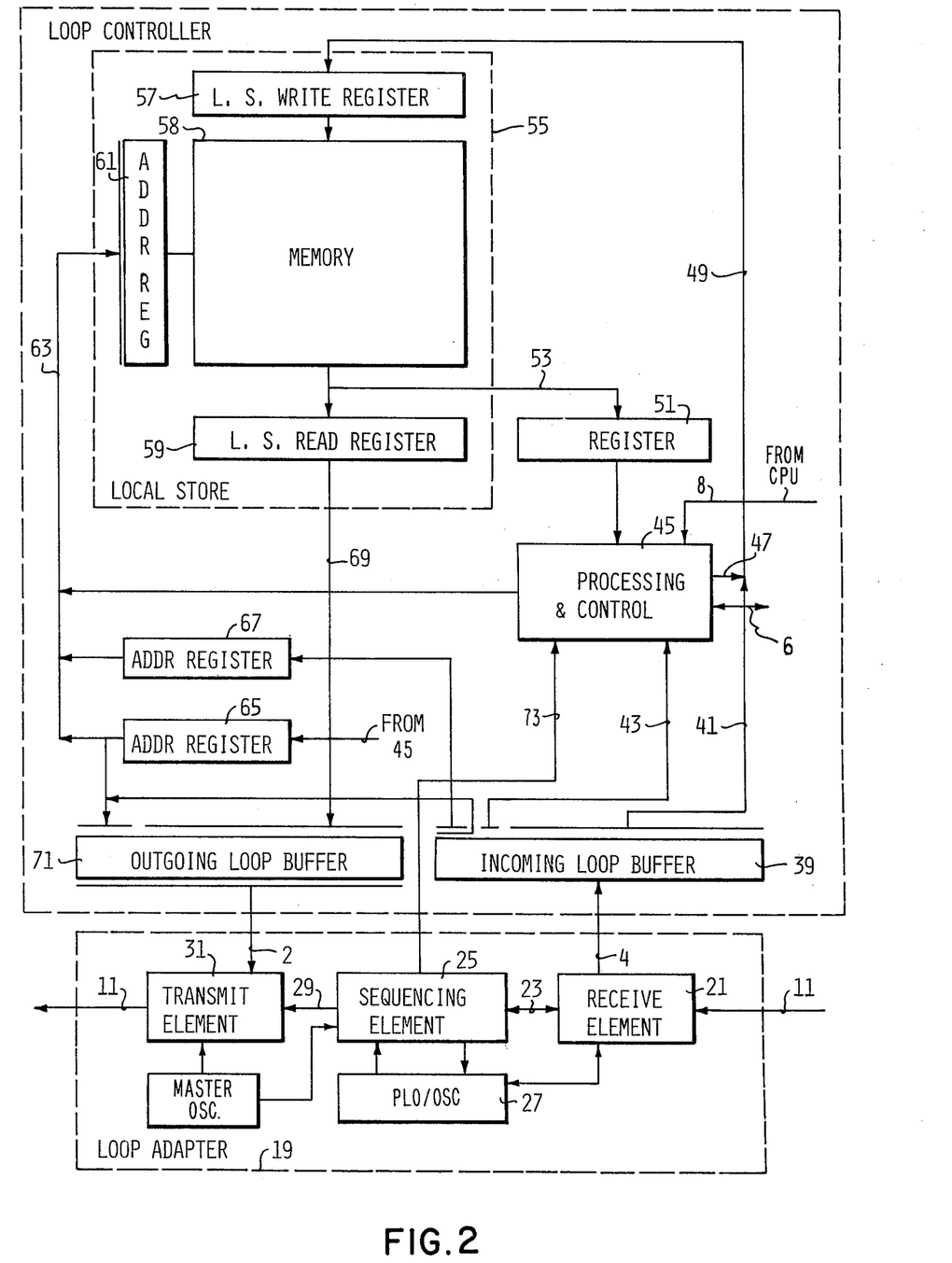
FIG. 2 sets forth some of the logic details of the loop controller and loop adapter set forth in FIG. 1.

The out-of-synch state is entered when power is first turned on and the reset line is conditioned by any of the device adapters. It is also entered when in the bit synch or tentative synch states and three synch bits are found missing in any one 12-byte frame time period. The out-of-synch state disrupts the normal operations of the loop by forcing blank frames by the serial converters and synch frames by the loop adapter to be transmitted irrespective of what is being received. Recall that blank frames contain all zeroes except for synch bits every ninth bit. Before attempting to synch the phase lock oscillator 27 to the incoming synch bits, loop adapter 19 must confirm that it is receiving synch frames or blank frames. Further recall that synch frames are similar to blank frames except for the addition of a frame bit every twelfth synch bit. This type of frame is transmitted by the loop adapter when it is out-of-synch or when it receives blank frames.

When loop adapter 19 is in state A1 (blank frame search) it is essentially searching for blank frames or synch frames. This is done by shifting all separated data into deserializer 24 and checking for the presence of the proper number of sequential zeros in between synch bits as performed by synch detector 32. When 11 blank bytes have been received, state A2 (synch search 1) is entered. In this state, the twelfth blank byte is confirmed and the synch bit at the end of this byte is used to reset the bit counter so as to correspond to the incoming synch bits.

When in out-of-synch states A1 and A2, the phase locked oscillator 27' is allowed to freerun and no correction signals are generated by the incoming data. When the bit counter has been reset, synch state A3 (synch search 2) is entered. In this state the phase locked oscillator phase correction signals are generated based on the timing of the leading edge of each synch bit with respect to the PLO output clock.

During state A3, blank bytes and regular synch bits are continually confirmed. If any thing other than blank or synch frames are received, then the out-of-synch state of blank frame search is reentered.

When a number of consecutive synch bits occur on time and the phase lock oscillator is considered in synch then the bit synch state is entered. In this state, the loop adapter continues to generate synch frames. Synch bits are confirmed to be on time. The loop adapted searches for the frame bit sequence in a synch frame and when they are detected the transfer counter is reset to the incoming frames and the tentative synch or state C is entered.

In the tentative synch state, the CRC checking and generating circuits 50 are activated. This places valid CRC bytes at the end of every frame. When a valid CRC is received and checked by CRC checker 34, the loop adapter steps into the true synch state.

In the true synch state, normal operations resume. The loop controller now receives and sends information. The loop adapter continually monitors the frame and synch bits to see that they continue on time. An invalid frame sequence in which three missing synch bits are detected in any one frame time will cause the true synch to be dropped and the tentative synch to be reentered.

True synch is also lost when a blank frame or a synch frame is detected by synch detector 32. A blank frame will automatically revert the loop adapter into the bit synch state because of the missing frame bits. If true synch is not lost when receiving synch frames, then flase CRC errors will be reported. It is sufficient for the loop adapter to assume a synch frame if the first byte of a frame which contains a valid frame bit sequence contains all zeros in bits 1 to 7.

The following table summarizes the previously described synch control states.

| | State | Function | Condition For Advancing To A Higher State | Condition For Regressing To A Lower State |
|---|---|---|---|---|
| A | Out-of-Synch | — | — | — |
| A1 | Blank, Frame, Search | Search for Valid Blank Frame | 11 Successive 0 Bytes | — |
| A2 | Synch, Search 1 | Reset the Bit Counter | 1 More 0 Byte and Bit Counter Reset | None-Zero Byte Or Missing Synch Bit |
| A3 | Synch PLO 27 | Synch Outgoing Counter to Incoming Counter | A Certain Number Synch Bits on Time | Non-Zero Byte Or Missing Synch Bit |
| B | Bit Synch | Search For Synch Frame And Reset Transfer Count | Reset Byte Counter and Find Two More Valid Frame Sequences | Non-Zero Byte Missing Synch Bit |
| C | Tentative Synch | Search for Valid CRC | Find One Valid CRC | Two Missing Synch Bits or Invalid Frame Bit Sequence In Any Frame |
| D | True Synch | Normal Operation | — | Two Missing Synch Bits or Invalid Frame Bit Sequence |

| State | Function | Condition For Advancing To A Higher State | Condition For Regressing To A Lower State |
|---|---|---|---|
| | | | in Any Frame or Blank Frame, or Synch Frame Received |

General Data Flow in the Loop System

In the ensuing paragraphs, a logic level description is given of the control and data flow of information from the loop controller through the loop and to the storage devices with particular reference to loop adapter 19, a typical serial converter 13.

Referring now to FIG. 2 when taken together with FIG. 1, there is shown that the loop adapter 19 couples controller 7 over data paths 2 and 4 and control path 73. The loop adapter receives and terminates the serial data signals from the incoming loop 11. The adapter amplifies, clocks the signals and deserializes them in receive amount 21 for transmission to the controller over path 4 to incoming loop buffer 39. The adapter also accepts outgoing data from the controller over path 2 and serializes said data in the transmit element 31 for transmission on the loop. The adapter includes circuits for checking the cyclical redundancy code of every incoming frame and for generating the CRC for all outgoing frames. The CRC errors that the adapter may detect as well as other device or data anomalies are communicated to the controller via the control path 73.

Adapter 19 contains synch control logic to implement the synch system previously described. Since there are two types of synch information transmitted on the loop, namely, bit synch and frame synch, both of them must be attained and further confirmed by a CRC check before true synch is achieved. True synch is a necessary prerequisite before any of the serial converters 12, 13, 15, 17 and adapter 19 can originate information on the loop.

Referring now to FIG. 2 when taken together with FIG. 3, it is apparent that the receive element 21, sequencing element 25 and transmit element 31 of loop adapter 19 are in substantial one-to-one relation with the same elements to be found in the serial converter 13 shown in FIG. 3. In the subsequent description of obtaining initial synch, reference will be made to the elements in FIG. 3 that correspond to the same elements in FIG. 2, not shown.

Referring now to FIG. 3, there is shown a data flow diagram for serial converters 12, 13, 15, 17 and, with modification, loop adapter 19. As As is apparent, each of the serial converters and loop adapters is partitioned into three separable elements. These are, respectively, the receive element 21, sequencing element 25, and transmit element 31. The receive element transfers information from loop path 11 through device adapter 9 for recording on the appropriate storage device 3. Transmit element 31 transfers information from the storage device through the adapter for transmission onto loop path 11. Sequencing element 25 maintains the necessary clock controls for sequencing the various detectors and registers within the serial converter under control of the device adapter.

Incoming path 11 terminates in data clocking network 22. The network is responsive to the leading edge of each data bit in order to sample the level of a symmetrical clock signal. Now, each time a data bit is received by network 22, there is generated an increasing or decreasing frequency signal based on the relative phase of the incoming data signal compared to the PLO clock signal. These signals are applied to the phase locked oscillator 27.

The function of clock control 38 is to provide timing signals, which signals can be used to govern the operation of the serial converter. Whereas in the serial converter both the receive and transmit elements are clocked by the phase locked oscillator 27, only the receive element of the loop adapter is clocked by the PLO. The transmit element of the loop adapter is clocked by a stable master oscillator preferably crystal controller.

Bit/byte counters included in sequencing element 25 identify which of the 6 two-byte pairs of each frame is being processed in the serial converter and would provide timings for data transfer to and from the device adapter, identification of frame control bytes, and identification of CRC bytes.

When the serial converter is not synchronized to incoming data, then the bit/byte counters will run from the freerunning PLO clocks. When a synch bit is detected, the bit counter portion of sequencing element 25 will be reset to correspond to the synch bit.

Deserializer 24 couples the output from data clocking network 22 to parity generator 26, receive register 30, synch detector 32 and CRC checker 34, all in parallel. The deserializer consists of a bit accummulator which offloads each byte's worth of bits into the receive register 30. Control of shifting and offloading is accomplished by timing signals from the sequencing element 25.

Receive register 30 is an 18-bit buffer partitioned as two bytes of data with parity for transferring data between the serial converter and the device adapter. It is also used as a temporary store of loop data which the device adapter makes a decision about changing the outgoing loop data.

The first byte of deserialized data is transferred from deserializer 24 into the first half of the receive register 30 over path 28. The second byte then accummulates in the deserializer and is transferred to the second half of the receive register. Note, that parity generator 26 is attached to the deserializer output. Odd parity is generated for each of the two bytes and loaded into the proper position in the receive register.

Each serial converter contains two sets of cyclic redundancy code (CRC) logic. One set is for checking incoming frames and one for generating the code for outgoing frames originating at the serial converter. There are a number of methods for generating and checking CRC known in the art, i.e., parallel or serial, with any one of a number of appropriate devisor polynomials.

The CRC register is effectively initialized by blocking feedback during the first two byte's input of each frame. The CRC is transmitted with a high order polynomial coefficient first. The CRC is coded on all bits in each frame with the exception of the synch bits every ninth bit. The bits comprising the CRC are appended to each frame immediately after the data field.

Transmit register 46 is driven by buses 4 and 2. It is an 18-bit buffer and is partitioned as two bytes of data with parity for transferring data between the device adapter and the serial converter or to feed through loop data from the receive register. Parenthetically, the loop adapter does not have a direct connection from the receive register to the transmit register as does the serial converter.

The bit/byte counters and the synch control system govern the functions of the serial converter. The counters and the synch control system feed the logic and sequence of all operations. The byte count indicates the pair of bytes being decoded in the incoming frame. It is used to gate write data across bus 4, read data, status and write requests across bus 2 into register 46.

Parity checker 44 is one of three logic units driven by transmit register 46 over path 48. It checks for odd parity one byte at a time as data is being loaded into the serializer 52 and CRC generator 50. A parity error detected by check 44 will set the parity check line 42 to the device adapter if it was found in data received from the adapter.

Serializer 52 has the function of receiving one byte of parallel data and generating equivalent serial data therefrom. The serializing and loading of register 52 is controlled by the outgoing counter in sequencing element 25.

The output from the serializer 52, in turn, drives encoder 54 and loop drive 56. Both encoder 54 and decoder and data clocking element 22 may be of any form for conditioning or receiving the signal to propagate on path 11.

While the invention has been particularly shown and described with reference to a preferred embodiment thereof, it will be understood by those skilled in the art that various changes in form and details may be made therein without departing from the spirit and scope of the invention.

What is claimed is:

1. A method for resynchronizing a primary terminal and a plurality of secondary terminals in a loop communication system, each terminal being adapted to receive and transmit frame delimited bit stream messages from and to the loop, each terminal being further adapted to detect synchronization and synchronization anomalies, the method comprising the steps of:

detecting at any terminal the existence of a synch anomaly and immediately inhibiting all bit stream message transmission;

transmitting on the loop a first unique pattern by the terminal detecting the anomaly;

resynchronizing to the first unique pattern as a reference by each terminal downstream to the terminal detecting the anomaly and including the primary terminal;

transmitting on the loop a second unique pattern by the primary terminal responsive either to the first pattern or a synch anomaly;

resynchronizing of all terminals upstream from the terminal detecting the synch anomaly to the second pattern as a reference; and resuming reception and transmission of bit stream messages upon the extinction of the synch anomaly as when the terminal detecting the anomaly has resynched to the second pattern.

2. A method for resynchronizing according to claim 1, wherein the frame delimited bit stream message include a synch bit every $n$ bits and a frame synch bit pattern included between certain synch bits every $mn$ bits, there being $m[n+1]+1$ bits in each frame inclusive of synch bits.

3. A method for resynchronizing according to claim 2, wherein the first pattern consists of a repetitive sequence of $n$ "zero" bits interleaved by a synch "one" bit; and further wherein the second pattern consists of a frame with a frame delimiting codes as frame synch and in which all bits other than synch bits are "zero".

4. A method for resynchronizing a primary terminal and a plurality of secondary terminals in a loop communications system, each terminal being adapted to receive and transmit frame delimited bit stream messages from and to the loop, each of the messages including bit and frame synchronizing information, each terminal being further adapted to detect bit and frame synch and anomalies thereto responsive to each received frame, the method comprising the steps of detecting at any terminal a synch anomaly from a received frame and immediately inhibiting all bit stream message transmission from said terminal;

transmitting on the loop a first unique bit stream pattern by any terminal detecting an anomaly;

resynchronizing by any terminal including the primary downstream from any terminal detecting an anomaly to the first unique pattern as a reference, each downstream terminal either feeding through the received first pattern upon resynching or transmitting its own first pattern phase independent of its received first pattern;

transmitting on the loop a second unique bit pattern by the primary terminal responsive either to a received first pattern or a synch anomaly;

resynchronizing by any terminal upstream from that terminal detecting an anomaly closest to the primary terminal output to the second pattern as a reference; and resuming reception and transmission of bit stream messages upon the extinction of the synch anomaly as when each terminal in order of proximity to the primary terminal output has resynched to the second pattern.

5. A method for resynchronizing according to claim 4, wherein the frame delimited bit stream messages include a synch bit every $n$ bits and a frame synch bit pattern included in the first $n$ bits every $mn$ bits, there being $m[+1]+1$ bits in each frame inclusive of synch bits.

6. A method for resynchronizing according to claim 5, wherein the first pattern consists of a repetitive sequence of $n$ bits of a first binary value interleaved by a synch bit of a second binary value; and further wherein the second pattern consists of a frame synch bit of the second binary value, which frame synch bit is repeated every $m[n+1]$ bits inclusive of synch bits.

7. In a system having a primary terminal, secondary terminals, and a unilateral path coupling the terminals to form a loop, each terminal being adapted to selectively generate repetitive framing intervals of duration less than the loop latency, each terminal being further adapted to receive and regenerate said frames in bit and frame synchronism; each frame including a synch bit every $n$ bits and a frame sych bit every $m[n+1]$ bits inclusive of synch bits;

each terminal including a receiver responsive to each frame as it passes the terminal on the loop;

a sender for generating frames to the loop; and a selective feedthrough element coupling the receiver to the sender;

the receiver comprising a modulo $[n+1]$ and modulo $m[n+1]$ counting means;

means for incrementing the counters on a bit basis as the frames are received;

means for storing consecutive synch and frame synch bits;

means for indicating bit asynchrony upon a predetermined number of consecutive synch bits mismatching and for indicating frame asynchrony upon a predetermined number of frame synch bits mismatching;

means for inhibiting the feedthrough means responsive to indications of asynchrony and for connecting a source of unique repetitive bit patterns to said sender; and means for disabling said inhibit means upon the cessation of asynchrony indications.

* * * * *